(12) United States Patent
Cordes et al.

(10) Patent No.: US 11,293,432 B2
(45) Date of Patent: Apr. 5, 2022

(54) FLUID END FOR A PISTON PUMP FUNCTIONING AS A MUD PUMP

(71) Applicant: BENTEC GMBH DRILLING & OILFIELD SYSTEMS, Bad Bentheim (DE)

(72) Inventors: Malte Cordes, Rheine (DE); Michael Gelker, Lingen (DE)

(73) Assignee: BENTEC GMBH DRILLING & OILFIELD SYSTEMS, Bad Bentheim (DE)

( * ) Notice: Subject to any disclaimer, the term of this patent is extended or adjusted under 35 U.S.C. 154(b) by 195 days.

(21) Appl. No.: 16/302,039

(22) PCT Filed: Jun. 23, 2017

(86) PCT No.: PCT/EP2017/065607
§ 371 (c)(1),
(2) Date: Nov. 15, 2018

(87) PCT Pub. No.: WO2018/001912
PCT Pub. Date: Jan. 4, 2018

(65) Prior Publication Data
US 2019/0154035 A1    May 23, 2019

(30) Foreign Application Priority Data
Jun. 28, 2016    (DE) .................. 20 2016 103 412.4

(51) Int. Cl.
*F04B 53/22*    (2006.01)
*F04B 1/12*    (2020.01)
(Continued)

(52) U.S. Cl.
CPC ............ *F04B 53/22* (2013.01); *F04B 1/0452* (2013.01); *F04B 1/122* (2013.01); *F04B 15/02* (2013.01);
(Continued)

(58) Field of Classification Search
CPC ........ F04B 15/02; F04B 1/0452; F04B 1/122; F04B 53/007; F04B 53/10; F04B 53/1002; F04B 53/102
See application file for complete search history.

(56) References Cited

U.S. PATENT DOCUMENTS 3,412,931 A * 11/1968 Palmer .................. F04B 53/102
137/454.4
3,427,988 A    2/1969 Redman et al.
(Continued)

FOREIGN PATENT DOCUMENTS

DE    102006017036    10/2007
DE    602006000039    4/2008
(Continued)

OTHER PUBLICATIONS

International Search Report of Counterpart PCT International Application No. PCT/EP2017/065607.
(Continued)

*Primary Examiner* — Dominick L Plakkoottam
(74) *Attorney, Agent, or Firm* — Liu & Liu

(57) ABSTRACT

A water part module for attaching to a piston pump, which has a support unit that can be releasably attached to the piston pump and at least respectively one suction module and pressure module that is releasably connected to the support unit. The support unit and each suction module and each pressure module are designed such that the suction and pressure modules are interchangeable with one another. Each suction and pressure module have at least two planed side faces of which one acts as a lower connection face and a side face adjoining the lower connection face acts as a lateral connection face. A duct inside the respective suction and pressure module, which can be closed and opened by a valve in the respective suction and pressure module, ends on (Continued)

one side in the lower connection face and on the other side in the lateral connection face.

19 Claims, 8 Drawing Sheets

(51) Int. Cl.
| | |
|---|---|
| F04B 15/02 | (2006.01) |
| F04B 53/10 | (2006.01) |
| F16K 27/02 | (2006.01) |
| F16K 27/00 | (2006.01) |
| F04B 53/16 | (2006.01) |
| F04B 1/0452 | (2020.01) |
| F04B 53/00 | (2006.01) |
| F04B 1/122 | (2020.01) |
| E21B 21/10 | (2006.01) |

(52) U.S. Cl.
CPC ............ *F04B 53/007* (2013.01); *F04B 53/10* (2013.01); *F04B 53/1032* (2013.01); *F04B 53/16* (2013.01); *F16K 27/003* (2013.01); *F16K 27/0209* (2013.01); *F16K 27/0281* (2013.01); *E21B 21/106* (2013.01)

(56) References Cited

U.S. PATENT DOCUMENTS

| | | | | | |
|---|---|---|---|---|---|
| 4,623,303 | A | * | 11/1986 | Henderson | ............... F04B 9/14 137/270 |
| 4,768,933 | A | * | 9/1988 | Stachowiak | ........ F04B 53/1025 137/543.13 |
| 4,974,628 | A | * | 12/1990 | Tepermeister | ...... F04B 53/1002 137/454.4 |
| 5,171,136 | A | * | 12/1992 | Pacht | ................. F04B 53/1025 137/454.4 |
| 5,507,630 | A | * | 4/1996 | Hegebarth | ............... F04B 15/02 137/269.5 |
| RE36,178 | E | * | 4/1999 | Freudinger | ............... A21C 9/04 222/309 |
| 7,350,534 | B2 | * | 4/2008 | Riley | .................... F16K 15/044 137/15.22 |
| 7,748,966 | B2 | * | 7/2010 | Vu | ........................ F02M 59/464 417/454 |
| 8,074,679 | B2 | * | 12/2011 | Jensen | .................... F04B 53/16 137/512 |
| 8,511,218 | B2 | | 8/2013 | Cordes et al. | |
| 10,760,567 | B2 | * | 9/2020 | Salih | .................... F04B 53/1027 |
| 2008/0152523 | A1 | | 6/2008 | Jensen et al. | |
| 2009/0272364 | A1 | | 11/2009 | Vu | |
| 2011/0142701 | A1 | | 6/2011 | Small | |
| 2013/0228526 | A1 | * | 9/2013 | McAfee | ............... B01D 21/307 210/741 |
| 2014/0086774 | A1 | | 3/2014 | Chandrasekaran et al. | |
| 2014/0286805 | A1 | * | 9/2014 | Dyer | ...................... F04B 49/22 417/570 |
| 2015/0147194 | A1 | | 5/2015 | Foote | |
| 2017/0321815 | A1 | * | 11/2017 | Vuichard | ............... F16K 31/602 |

FOREIGN PATENT DOCUMENTS

| | | |
|---|---|---|
| DE | 102008060659 | 6/2010 |
| DE | 102011056712 | 6/2013 |

OTHER PUBLICATIONS

German Search Report of Related DE Application No. 20 2016 103 412.4.
European examination report and annex of related EP Application No. 17 739 889.8.
Machine translation of the annex European examination report.

* cited by examiner

FLUID END FOR A PISTON PUMP FUNCTIONING AS A MUD PUMP

BACKGROUND OF THE INVENTION

Field of the Invention

The invention concerns a 'fluid end'—as it is referred to in the technical literature—of a single or double-functioning reciprocating piston pump, in particular the fluid end of a powerful multi-piston pump; especially the fluid end of a powerful multi-piston pump functioning as a mud pump on a drilling rig for drilling on hydrocarbon reservoirs for example, or for the exploitation of geothermal energy, wherein the term multi-piston pump comprises piston, plunger and membrane pumps.

Description of Related Art

As is generally known, a displacement, piston or mud pump comprises two functional sections, namely a drive unit and a 'fluid end' functioning as a working chamber. The fluid end enables the actual pumping process and comprises at least one pressure-side valve (pressure valve) and at least one suction-side valve (suction valve), normally with one suction valve and one pressure valve for each piston of the mud pump. The drive unit drives the pistons, and their consequent oscillating movement results in an alternating suction and pressure stroke, wherein the suction and pressure valves or the suction and discharge valves are opened and closed to open the fluid end to the suction-side or pressure-side piping in each case.

In a manner that is itself generally known, a mud pump is used to pump the 'drilling mud' under high pressure (e.g. 500 bar) through the drill string into the borehole, down to the bottom of the borehole, and up again outside the drill string (through the 'annular space'). The components of the fluid end in particular are exposed to heavy wear due to the abrasive drilling mud and the 'drilling debris' discharged with the drilling mud. This makes it necessary to periodically replace the fluid end and its components, such as valves. Comparable requirements are also placed on 'frac pumps', which are used for the extraction of 'shale gas deposits'. Other known areas of application and designs may include the mining industry, for example in respect of membrane pumps and/or using plungers to replace pistons.

Complete replacement of a fluid end is very costly because of the masses that need to be moved in the process. As such, the fluid end has been designed to be modular, in such a way that a fluid end module—comprising a suction valve and a pressure valve—is assigned to each piston of the mud pump. Even the replacement of this type of individual fluid end modules is still very time-consuming, as the fluid end module masses to be moved are considerable. In addition, replacement often requires the loosening of screw connections that are difficult to access. Even with a two-part embodiment, of a fluid end module divided into a suction part and a pressure part as has become known from US 2008/152523 A1 for example, weights of 1,000 kg and more for the pressure part and 450 kg for the suction part are still to be assumed.

Based on this, one task of the present invention is to improve the possibilities for replacing wearing parts in a mud pump.

SUMMARY OF THE INVENTION

This task is tackled by means of a fluid end module, a support unit, a valve module, and a piston pump with the features of the respective independent claims.

The main application of the innovation proposed here concerns powerful multi-piston pumps which can be used as mud pumps on a drilling rig, even if the innovation is not limited to this and can also be considered for a general type of piston pumps as well as generally for displacement pumps, in particular displacement pumps with at least one exchangeable pressure element. Without waiving any further general validity, the following description refers to a mud pump: that is, a powerful multi-piston pump functioning as a mud pump on a drilling rig, wherein each use of the term 'mud pump' also includes a general type of piston pump, which therefore must be considered covered by the description presented here.

In general, the invention presented here is based on the fact that a fluid end module that would previously have one or two parts, is divided into at least three components. The central component is referred to, here and in the following, as a support unit. Further components are two valve modules, specifically a suction-side module referred to in the following as the suction module, and a pressure-side module referred to in the following as the pressure module. The support unit is intended and set up for attachment to a piston pump/high-pressure piston pump, in particular a piston pump functioning as a mud pump. In an arrangement with at least one suction module and at least one pressure module, and in particular an arrangement with precisely one suction module and precisely one pressure module, these modules can be releasably connected to the support unit; the/each suction module and the support unit, as well as the/each pressure module and the support unit are intended and set up for such releasable connectability, for example by means of the support unit having blind boreholes with an internal thread, and the/each suction module and the/each pressure module having through-holes for screw bolts or threaded bolts that can be screwed into the internal threads of the support unit.

The support unit as modular basis for the fluid end module is one aspect of the innovation presented here. When assembled and ready for use, a further aspect of the innovation presented here is a modular fluid end module which is intended and set up for attachment to a piston pump/high-pressure piston pump, in particular a piston pump functioning as a mud pump. The modular fluid end module comprises the support unit mentioned above and explained in further detail below, as well as, in each case, at least one suction module and one pressure module that is releasably connected or can be releasably connected to the support unit.

The suction module and the pressure module each comprise a valve with an associated valve seat and connection options for connection to a support unit on the one hand, and to a manifold on the other hand. Optionally, the suction module and the pressure module have the same embodiment, wherein "same embodiment" does not necessarily mean that the suction module and the pressure module are identical. However, the suction module and the pressure module having the same embodiment means that each such module can be attached to either the suction side of the support unit or the pressure side of the support unit. By the same token, the embodiment of the support unit is such that suction and/or pressure modules which have the same embodiment can be connected to it. The same embodiment of the suction and/or pressure modules also optionally includes that these modules each have identical valves and valve seats. The function as a suction module or as a pressure module is correspondingly not determined by the structural details of the respective module, but by attachment location. In a special embodiment, the support unit has two valve modules attached which not only feature the same embodiment as described above but are in fact identical, with one such valve module functioning as a suction module and the other as a pressure module; and a fluid end module formed using the support unit comprises two identical valve modules, one of which functions as a suction module and the other as a pressure module.

A valve module functioning as a suction module or as a pressure module, and in particular a valve module which can function as either a suction module or a pressure module depending only on the location at which it is attached, is preferably characterized by at least two planned lateral faces, one of which functions as a first or lower connection face, with another lateral face adjoining this first or lower connection face which functions as a second or lateral connection face, and wherein a channel in the interior of the valve module ends at least on one side (on the one hand) in the first/lower connection face and on the other side (on the other hand) in the second/lateral connection face. In a special embodiment, the valve module takes the basic shape of a cuboid with six lateral faces, wherein one lateral face functions as the first/lower connection face and another lateral face adjoining the first/lower connection face functions as the second/lateral connection face. The channel in the interior of the valve module can be blocked and released by means of a valve surrounded by the valve module, and during valve module operation the channel is blocked and released by means of the valve, i.e. blocked and released synchronously with a mud pump piston movement. As a result of the channel of the valve module ending on the one hand in the first/lower connection face and on the other hand in the second/lateral connection face, the valve module can be attached directly to the respective mud pump either at the first/lower connection face or at the second/lateral connection face, or indirectly attached to the mud pump by means of a support unit attached to the mud pump or which is attachable to the mud pump. The connection face not used for attachment or indirect attachment (via the support unit) to the mud pump is available for the connection of a manifold for the rinsing fluid flowing in the direction of the mud pump (suction side) or the rinsing fluid pumped from the mud pump to the drill string (pressure side). Each valve module attached to a support unit can therefore be individually released from the support unit in a beneficial manner, for example for maintenance purposes, while the support unit remains mounted, a manifold previously connected to the valve module remains mounted, and the/each other valve module attached to the support unit also remains mounted. The mass to be moved in the event of maintenance is therefore reduced to the mass of the valve module to be maintained, which represents a considerable simplification and reduction in the work required. In the case of a special embodiment of the valve modules, a valve cover, which secures a valve located inside the valve module in a manner that is generally known, is accessible on a lateral face opposite the first/lower or second/lateral connection face. This ensures that the valve cover is accessible, even when the valve module is attached to the support unit and the respective manifold is attached to the valve module. With such an embodiment, the valve cover of each valve module can also be released for maintenance purposes or similar, while the respective valve module itself remains mounted, a manifold connected to the valve module remains mounted, and the/each other valve module also remains mounted.

The above-stated task is also addressed by means of a fluid end module which is intended and set up for attachment to a piston pump/high-pressure piston pump, in particular a piston pump functioning as a mud pump, in that the fluid end module comprises a support unit of the type described here and in the following, and in each case at least one suction and pressure module of the type also described here and in the following, which is releasably connected or can be releasably connected to the support unit.

Finally, the above-stated task is also addressed by means of a piston pump, in particular a piston pump functioning as a mud pump, with at least one support unit and/or at least one valve module functioning as a suction module or as a pressure module, and/or at least one fluid end module. The support unit, the valve module, or the fluid end module are in each case devices as described here and in the following. Such a piston pump shall preferably have a number of such support units corresponding to the number of pistons of the piston pump, and in each case such a valve module functioning as a suction module and as a pressure module, or a number of such fluid end modules corresponding to the number of pistons. Such a piston pump preferably functions as a mud pump for pumping drilling debris during deep drilling on carbon deposits or for geothermal energy. Depending on the embodiment, such individual carrier modules may also be combined in a single monoblock.

The division of a previously known one-part fluid end module (e.g. US 2015/0147194 A1) or an also known two-part fluid end module (e.g. US 2008/152523 A1) into at least three components, namely a support unit, suction module and pressure module, results in various advantages:

As is generally known, the valves of mud pumps and similar, but also the respective valve seats and connection faces, are wearing parts. The closing parts/blocking bodies of the valves can be replaced in the conventional manner when necessary. In the event of wear to a valve seat and/or a connection face, the valve modules as a whole (suction module with suction-side valve, pressure module with pressure-side valve) can now also be replaced individually, requiring only the weight of the respective valve module to be moved. This is significantly less than the weight of a previously known one-part fluid end module. In a generally known two-part fluid end module, one of the parts—the first part—comprises the suction-side or pressure-side valve, so for example the pressure-side valve, and the other part—the second part—functions correspondingly as the pressure-side or suction-side valve module and comprises, for example, the suction-side valve. The first part with the pressure-side valve is attached to the mud pump. The second part with the suction-side valve is attached to the first part. The first part then incorporates a channel inside a mostly solid metal block, with the channel leading on one side to the mud pump and on the other to the suction-side valve and the pressure-side valve. The first part is therefore much heavier than the second part, and is also much heavier compared to a suction module or a pressure module such as in the innovation proposed here.

In addition to an individual suction module or an individual pressure module being easier to handle as a result of its lower weight, the invention with its three-part fluid end module also benefits from the fact that each valve module can be replaced individually when necessary. In the case of a fluid end module in a generally known two-part embodiment, the second part must also be removed—and reattached later—when the valve incorporated in the first part is replaced, even if the second part does not require replacement.

Another substantial advantage is that the support unit functions as a universal adapter part, with the result that the valve modules which can be connected to the support unit can be used with a wide variety of mud pumps without any structural changes required. Any necessary adaptation to fit the respective mud pump is restricted to the support unit, and there to the lateral face oriented toward the mud pump for attachment and connection. Here, it may be necessary to adapt to a particular connection situation, for example adaptation to a connection pattern/drilling pattern of the respective mud pump and/or adaptation to the cross-sections of the outlet opening of the respective cylinder of the mud pump. In consideration of this, it would be possible to create suitable support units for various types of mud pumps, each with lateral faces appropriately sized for attachment to the respective type of mud pump; by means of these support unit variations uniform valve modules may be used with different types of mud pumps, functioning as a suction module or as a pressure module depending on the location at which they are subsequently attached to a support unit. This gives operators of non-homogeneous fleets of mud pumps or other pumps various economic and technical advantages when standardizing their systems.

Finally, the division of the fluid end module into three components, including two identical or for the most part identical valve modules of at least the same embodiment, simplifies warehousing. The operator of the respective mud pump does not need to have different assemblies in stock for the suction side and pressure side respectively, and each valve module can be used either as a suction module and attached to the support unit, or used as a pressure module in the same way.

All documents cited in the description presented here are expressly included in the disclosure content of the present application, e.g. US 2015/0147194 A1 regarding the technical background described therein for the use of a piston pump as a mud pump.

A connection module for attachment to a piston pump, comprising a suction-side and a pressure-side valve in the connection module itself, is known from US 2015/0147194 A1. A connection module can be attached to the piston pump in series with further connection modules. A plurality of connection modules can be connected to a suction-side and a pressure-side manifold.

Advantageous embodiments of the invention are the subject matter of the dependent claims. The retroactive references used herein refer to the further development of the subject matter of the independent claim based on the features of the respective dependent claim; these should not be considered to be renouncing the attainment of independent objective protection for the feature combinations of the related dependent claims. Further, with respect to an interpretation of the claims as well as a more detailed specification of a feature in a dependent claim, it is to be assumed that such a restriction is not present in the respective preceding claims. Further, with respect to an interpretation of the claims as well as the description of a more detailed specification of a feature in a dependent claim, it is to be assumed that such a restriction is not present in the respective preceding claims as well as in a more general embodiment of the object defined therein. Any reference in the description to aspects of dependent claims should therefore be explicitly read as a description of optional features, even without a specific reference to this effect.

In the case of an embodiment of the support unit which contains an internal channel for the medium pumped by the mud pump during operation, this channel is open to three different lateral faces of the support unit, namely to a lateral face via which the support unit when attached connects to the mud pump, a lateral face to which a valve module functioning as a suction module can be attached or is attached, and a lateral face to which a valve module functioning as a pressure module can be attached or is attached. The opening of the channel in the interior of the support unit to the stated lateral faces has the effect that each of the lateral faces functions as a connection face, namely for connecting the support unit to the respective mud pump, for connecting a valve module functioning as a suction module to the support unit, and for connecting a valve module functioning as a pressure module to the support unit. Having the different lateral faces functioning as connection faces creates the greatest possible free space during assembly, i.e. when attaching the support unit to a mud pump and/or when attaching a valve module to the support unit.

In a special embodiment, it is intended that two adjoining edge, boundary or lateral faces of a support unit and a valve module each function as connecting faces for attaching a valve module to a support unit. An edge, boundary or lateral face of the support unit adjoins another such face of the respective support unit or valve module along an edge common to the two faces. Any bevel or similar is disregarded and is not considered to be a separate edge, boundary or lateral face. Two edge, boundary or lateral faces of the support unit which adjoin each other in this way and function as connecting faces enclosing a broadly L-shaped channel section inside the support unit. Two edge, boundary or lateral faces of each valve module, which also adjoin one another and which function as connecting faces, also enclose a broadly L-shaped channel inside the respective valve module. Each connection face of a valve module can be attached to each connection face of the support unit. This allows the greatest possible flexibility when attaching valve modules to the support unit. For example, all valve modules can be attached in such a way that all valve covers are accessible from above and correspondingly point upwards. For this purpose, the valve modules are attached in such a way that the lateral faces with valve covers—as opposed to the connection faces—are oriented horizontally or at least point upward. Likewise, all valve modules may be attached in such a way that all valve covers are accessible from the side and correspondingly point to the side. For this purpose, the valve modules are attached in such a way that the side faces with valve covers—as opposed to the connection faces—are oriented vertically or at least point to the side. A mixed configuration is also possible, for example in such a way that the valve covers of the valve modules functioning as suction modules point to the side, and the valve covers of the valve modules functioning as pressure modules point upwards, or vice versa. With a special, optional embodiment, the support unit and/or the valve module is/are characterized by connection faces that are at right angles to each other.

A special embodiment of the valve module which has a lower connection face and a lateral connection face, allows the valve module to be connected to a support unit either at the lower connection face or the lateral connection face by way of a plurality of boreholes each running from one lateral face to an opposite lateral face; that is a plurality of through boreholes running perpendicularly to the lower connection face, wherein one end of the boreholes is in the lower connection face and the other end is in a lateral face of the valve module opposite the lower connection face, as well as a plurality of through boreholes running perpendicularly to the lateral connection face, wherein one end of the holes is in the lateral connection face and the other end is in a lateral face of the valve module that is opposite the lateral connection face. These boreholes each allow the insertion of a screw bolt, threaded bolt, or similar, which connects the respective connection face by being screwed into an internal thread in the adjoining connection face of the support unit. Orienting the boreholes perpendicular to the respective connection face means that the boreholes of the two connection faces of a cuboid valve module inside the valve module are also perpendicular to each other and may even cross, whereby intersecting boreholes enable a small embodiment of the valve module.

The claims filed with the application are proposed formulations without prejudice to achieving further-reaching protection. Since, in particular, the subject matter of the dependent claims may constitute separate and independent inventions with regard to the state of the art on the priority date, the applicant reserves the right to make these, or other combinations of features previously disclosed only in the description and/or drawing, the subject matter of independent claims or divisional application. They may also contain independent inventions, the form of which is not dependent upon the subject matter of the preceding dependent claims.

In the following, an exemplary embodiment of the invention is explained in more detail with reference to the drawing. Objects or elements corresponding to one another are provided in all Figures with the same reference numerals.

The exemplary embodiment is not to be understood as a constraining of the invention. Rather, amendments and modifications are indeed also possible within the scope of this disclosure, in particular those which, for example, can be derived by experts with a view to addressing the task by combining or modifying some features and/or elements or procedural steps described in the general or specific part of the description and contained in the claims and/or the drawing, in connection with the general or specific part of the description, and which lead to a new object by means of combinable features, including in cases of manufacturing, testing and work procedures.

DETAIL DESCRIPTION OF ILLUSTRATED EMBODIMENTS

Figure 1:
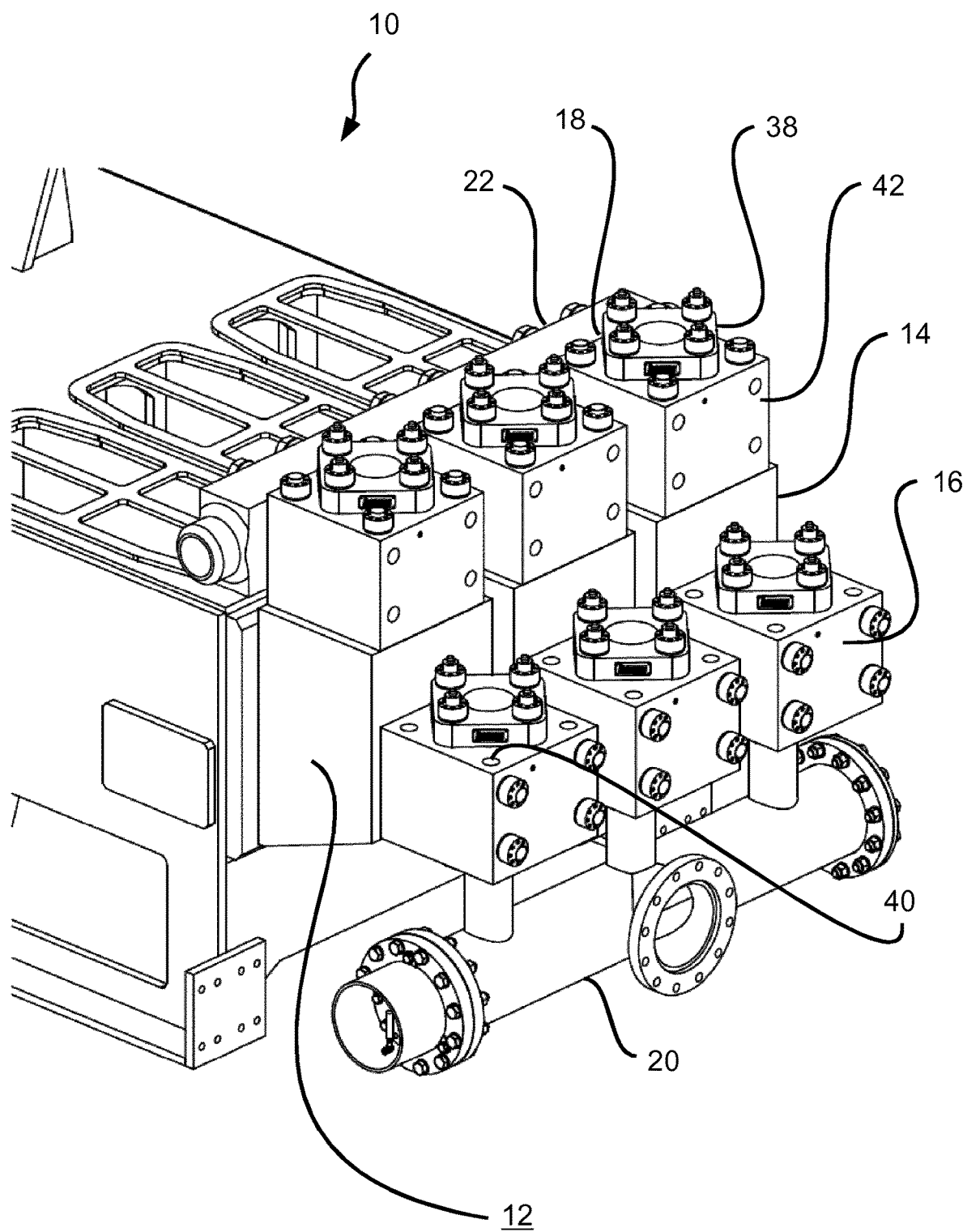
FIG. 1 shows a mud pump with several fluid end modules according to the proposed innovation.

FIG. 1 shows a schematically simplified isometric view of part of a multi-piston pump—which is itself generally known—functioning as a mud pump (10). For further details on the mud pump (10), reference can be made to DE 10 2011 056 712 A1, whose full disclosure content should be considered included in the description presented here in order to avoid unnecessary repetitions.

Corresponding to the number of pistons that are not visible, three fluid end modules (12) (only one designated in FIG. 1), which themselves function as part of the fluid end of the mud pump (10) are attached on the mud pump (10), that is on the 'fluid end' of the mud pump (10). Each fluid end module (12) comprises three basic components, namely a support unit (14), a suction-side valve module referred to as a suction module (16), and a pressure-side valve module referred to as a pressure module (18). The fluid end modules (12) are connected to each other via a manifold in a manner that is generally known, namely a suction-side manifold (20) and a pressure-side manifold (22). The suction modules (16) are connected to each other by means of the suction-side manifold (20). The pressure modules (18) are connected to each other by means of the pressure-side manifold (22). When the mud pump (10) is operated, a pipeline not shown here leads from the pressure-side manifold (22) to the borehole, by means of which the medium pumped with the mud pump (10), in particular the rinsing fluid, reaches the borehole, where it effectively rinses the borehole. When the mud pump (10) is in operation, piping (not shown here) leads from a rinsing fluid reservoir, which the mud pump (10) sucks the medium from, to the suction-side manifold (20).

Figure 2:
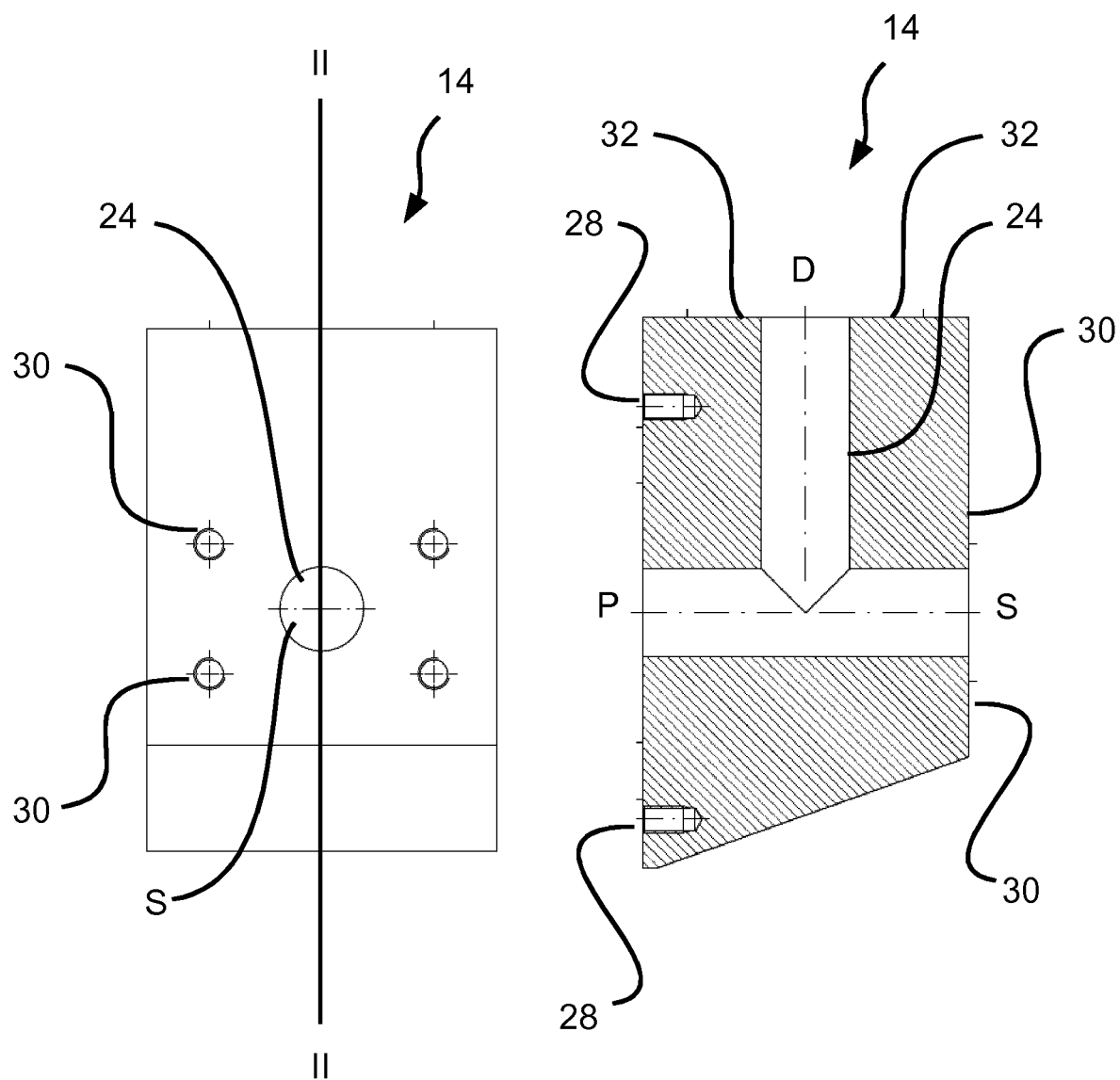
FIG. 2 shows a support unit of a fluid end module in accordance with FIG. 1.

FIG. 2 shows the support unit (14) in schematically simplified form: on the left side in a top view of the side face to which one of the valve modules, for example the suction module (16), can be attached and connected; and on the right side in a sectional view along the sectional plane of the II-II line marked on the left-hand diagram.

The support unit (14) is designed as a solid component, in particular as a solid metal component. Inside the support unit (14) there is a channel (24) from which the opening to one of the valve modules (16, 18), for example the suction module (16), can be seen on the left-hand representation in FIG. 2. In the sectional view shown on the right-hand side of FIG. 2, the channel (24) inside the support unit (14) can be seen to have a broadly T-shaped structure in the embodiment shown. For illustration purposes, letters denote the individual openings of the channel (24) in different side faces of the support unit (14). In the embodiment shown, the opening marked "P" is oriented toward the support unit (14) of the mud pump (10) ("P"=mud pump (10) side) when the support unit (14) is attached to a mud pump (10), and the opening is aligned with a corresponding outlet opening of a cylinder of the mud pump (10). In the embodiment shown, the two openings marked "S" and "D" are intended for the connection of a suction module (16) or a pressure module (18) ("S"=suction module (16) side; "D"=pressure module (18) side). One suction module (16) and one pressure module (18) are attached to the respective lateral faces of the support unit (14), at the end of the "S" and "D" openings respectively, and the "S" and "D" openings are aligned with a channel (26) (FIG. 3) inside the respective valve module (16, 18).

The channel (24) inside the support unit (14) therefore opens at three lateral faces of the support unit (14), each of which functions as a connection face: specifically to one lateral face by means of which the support unit (14) connects to the mud pump (10) when attached ("P" opening); one lateral face to which a valve module (16) functioning as a suction module (16) can be attached or is attached ("S" opening); and one lateral face to which a valve module (18) functioning as a pressure module (18) can be attached or is attached ("D" opening).

In the embodiment shown, the "D" opening from the lateral/connection face connects with the "P" opening from the respective lateral/connection face and forms a right angle with it. In the same way, the "S" opening from the lateral/connection face connects with the "D" opening from the respective lateral/connection face and also forms a right angle with it. The right-angled meeting of the connection faces represents a special, essentially optional embodiment. For example, the "P" opening from the connection face can be connected to the adjoining connection face at an acute angle (<90°) via the "D" opening. In the case of a connection face that has a "P" opening being vertical when attached, this would result in the connection face that has a "D" opening being more horizontally inclined than in the representation. If the "S" opening from the connection face continues to form a right angle with the "D" opening from the respective connection face, this results in the connection face that has an "S" opening of such a valve module (16, 18) being more vertically inclined than in the representation. Such an embodiment of the valve module (16, 18) can also be considered as an alternative to an embodiment with horizontally and vertically aligned lateral and connection faces. Similarly, an embodiment is considered in which, for example, the upper connection face that has a "D" opening is more horizontally inclined than in the representation, and in which the lateral connection face that has an "S" opening is oriented vertically and parallel to the connection face that has a "P" opening.

The T-shaped structure of the channel (24) inside the support unit (24) is also only shown as an example and should therefore not be understood as restrictive. For example, the channel section from opening "P" to opening "S" may be inclined instead of running broadly horizontally (as shown in FIG. 2), for example with an "S" opening higher than the "P" opening or an "S" opening lower than the "P" opening. In the same way, the channel section ending in opening "D" does not have to be vertical (as also shown in FIG. 2) and may also be inclined.

Blind holes (28, 30) are shown in the right-hand representation in FIG. 2. The blind holes (28) are shown to illustrate a way of attaching the support unit (14) to the mud pump's (10) side wall that is intended for attaching the support unit (14). It should be noted that these blind holes (28) are not necessarily positioned in sectional plane II-II. In the same way, two pairs of blind holes (28) may be located at the same, or broadly the same, distance from sectional plane II-II closer to the vertical lateral faces of the support unit (14) (i.e. in each case one blind hole (28) in the area of the corners of the support unit (14)). An alternative to blind holes is through holes (not shown) through the support unit (14). Threaded screws or threaded bolts can be inserted into such through holes and screwed into a thread on the side wall of the mud pump (10), wherein the thread is aligned with the respective through hole.

The blind holes (30) are used for attaching a valve module (16, 18), oriented to align with the "S" opening, to the corresponding lateral face of the support unit (14), e.g. for attaching a valve module (16) functioning as a suction module (16). Only two of four blind holes (30) distributed regularly around the "S" opening are marked on the left-hand representation in FIG. 2. The location of the blind holes (30) is marked on the right-hand representation in FIG. 2. The blind holes themselves are not shown because of the sectional line II-II selected.

The blind holes (32) are used for attaching a valve module (16, 18), oriented to align with the "D" opening, to the corresponding lateral face of the support unit (14), e.g. for attaching a valve module (18) functioning as a pressure module (18).

Figure 3:
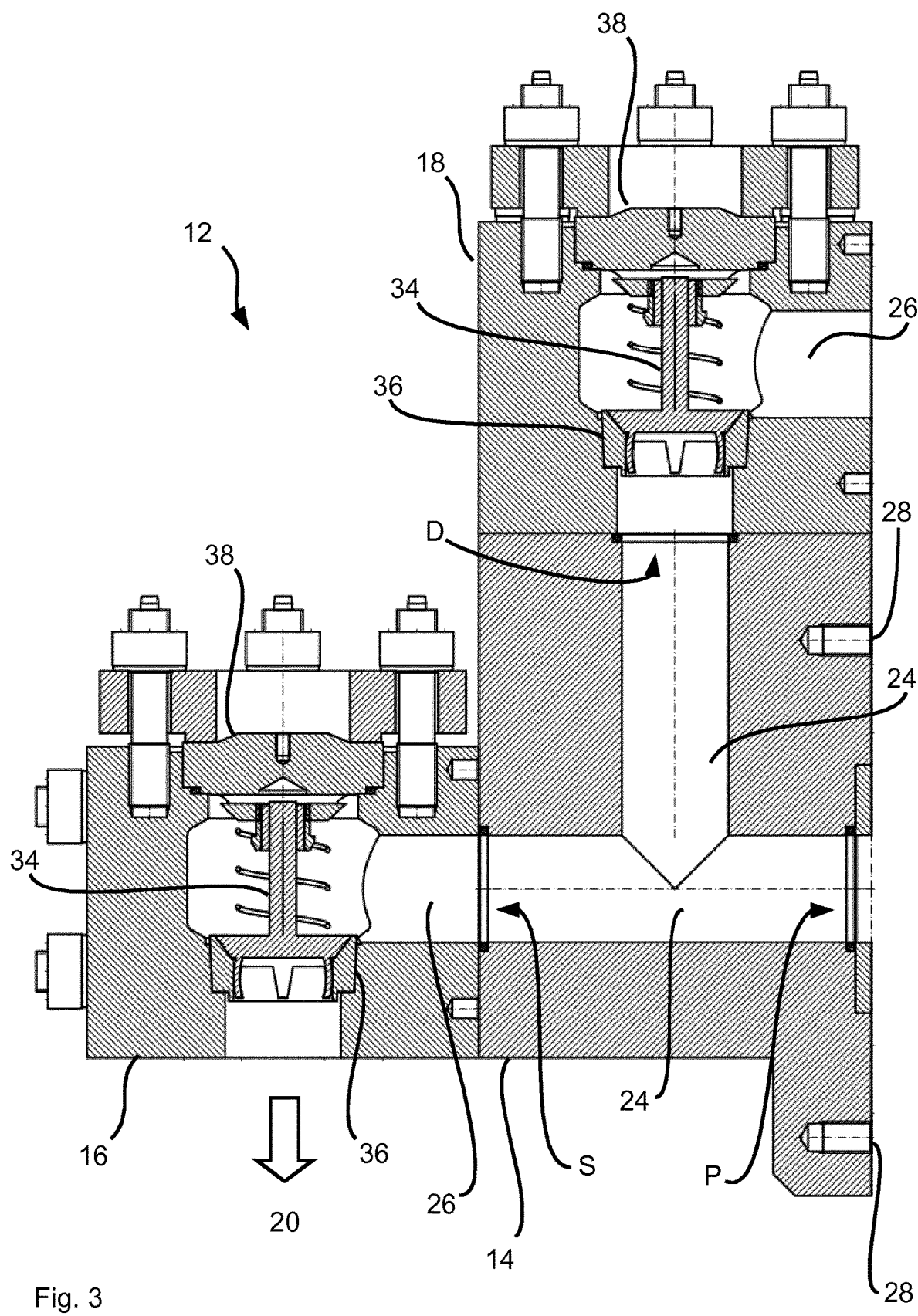
FIG. 3 shows a single fluid end module in accordance with FIG. 1, with the support unit incorporated and with two valve modules attached to the support unit in a sectional view.

FIG. 3 shows a section through the fluid end module (12) in the form of a section through the support unit (14), which the fluid end module (14) incorporates, and through the valve modules (16, 18), which are also incorporated by the fluid end module and are each attached to the support unit (14). The valve (34) and its valve seat (36) are visible inside each valve module (16, 18). The valve (34) opens or closes the channel (26) inside the valve module (16, 18). In the embodiment shown, the channel (26) is at a 90° angle and an opening of the channel (26) is located in adjacent side faces of the valve module (16, 18), which is generally cuboid.

The direction of the translatory movement that results from actuation of the valve (34) is used in the following as a reference value and to define the vertical axis of the valve module (16, 18). Along this vertical axis, in the direction of an extension of the section of the channel (26) that runs parallel to it, there is a valve cover (38) which can be releasably connected to the valve module (16, 18) and which secures the valve (34) inside the valve module (16, 18) in a manner that is generally known. For the possibility of advantageously attaching a valve cover (38) to a valve module (16, 18), reference can be made to DE 10 2011 056 712 A1 titled "Ventilabdeckung für eine Spülpumpe beim Tiefbohrbetrieb" ("Valve cover for a mud pump for deep drilling operation"), whose full disclosure content should be considered included in the description presented here in order to avoid unnecessary repetition.

It can be seen in FIG. 3 that both valve modules (16, 18) shown are of the same embodiment, with the result that each valve module (16, 18) can be attached both to the lateral face of the support unit (14) that has the "S" opening and to the lateral face of the support unit (14) that has the "D" opening. The angled course of the channel (26) inside the valve modules (16, 18) enables them to be used either as a suction module (16) or as a pressure module (18) and to be correspondingly attached to the support unit (14) on the suction side or the pressure side. It has already been mentioned that the channel (26) is open to two adjoining lateral faces of the valve module (16, 18) in the event that the geometry of the valve module (16, 18) is cuboid or generally cuboid. The lateral face which is opposite the valve cover (38) and has the opening of channel (26) located there is referred to in the following as the lower connection face. The side face with the other opening of the channel (26) is referred to in the following as the lateral connection face.

For attaching the valve module (16, 18) to a support unit (14), the valve module (16, 18) has through boreholes (40, 42) (FIG. 1), specifically through boreholes (40) that run from the lower connection side to the side face with the valve cover (38) and correspondingly parallel to the vertical axis of the valve module (16, 18), and through boreholes (42) running from the lateral connection side to the opposite side face and correspondingly perpendicular to the vertical axis. Depending on whether connection of the valve module (16, 18) to a support unit (14) must be effected by means of the lower or the lateral connection face, screw bolts or threaded bolts can be inserted into these boreholes (40, 42) (in FIG. 1, one of the total of four boreholes shown is marked with the reference number for only one valve module (16, 18) in each case), and the respective valve module (16, 18) can be secured to the support unit (14) by means of suitable screw bolts or threaded bolts. Effective screw bolts or threaded bolts for attaching a valve module (16, 18) to the support unit (14) are shown in FIG. 1 (for the embodiment shown, four are shown at each corner of the respective valve module (16, 18)).

FIG. 1 shows that the valve modules (16) designated as suction modules (16) are attached to the support unit (14) by way of their lateral connection faces, and that the manifold (20) connecting these valve modules (16) is attached to their lower connection faces. On the other hand, the valve modules (18) designated as pressure modules (18) are attached to the support unit (14) by way of the valve modules' lower connection faces, and the manifold (22) connecting these valve modules (18) is attached to the valve modules' lateral connection faces. Each valve module (16, 18)—that is, the channel (26) in it—can be flowed through from the lower connection face to the lateral connection face. In the valve modules (16) designated as suction modules (16), the medium pumped by the mud pump (10) enters the suction modules (16) via the suction-side manifold (20) connected to their lower connection faces, and enters the support unit (14) via the lateral connection faces. In the valve modules (18) designated as pressure modules (18), the medium pumped by the mud pump (10) enters the pressure modules (18) via the support unit (14) connected to their lower connection faces, and reaches the pressure-side manifold (22) via their lateral connection faces, and is transported from there—via pipelines not shown here—to the borehole in order to rinse the borehole using rinsing fluid.

In the embodiment shown in FIG. 1, all valve modules (16, 18) are attached to the support unit (14) with the valve covers (38) pointing upwards. Alternatively, the valve modules (16, 18) can also be attached to the support unit (14) with all valve covers (38) pointing to the side, for example. A mixed configuration is also possible, e.g. attachment wherein the valve covers (38) of the valve modules (18) designated as pressure modules (18) point upwards (as shown), and the valve covers (38) of the valve modules (16) designated as suction modules (16) point to the side.

Figure 4:
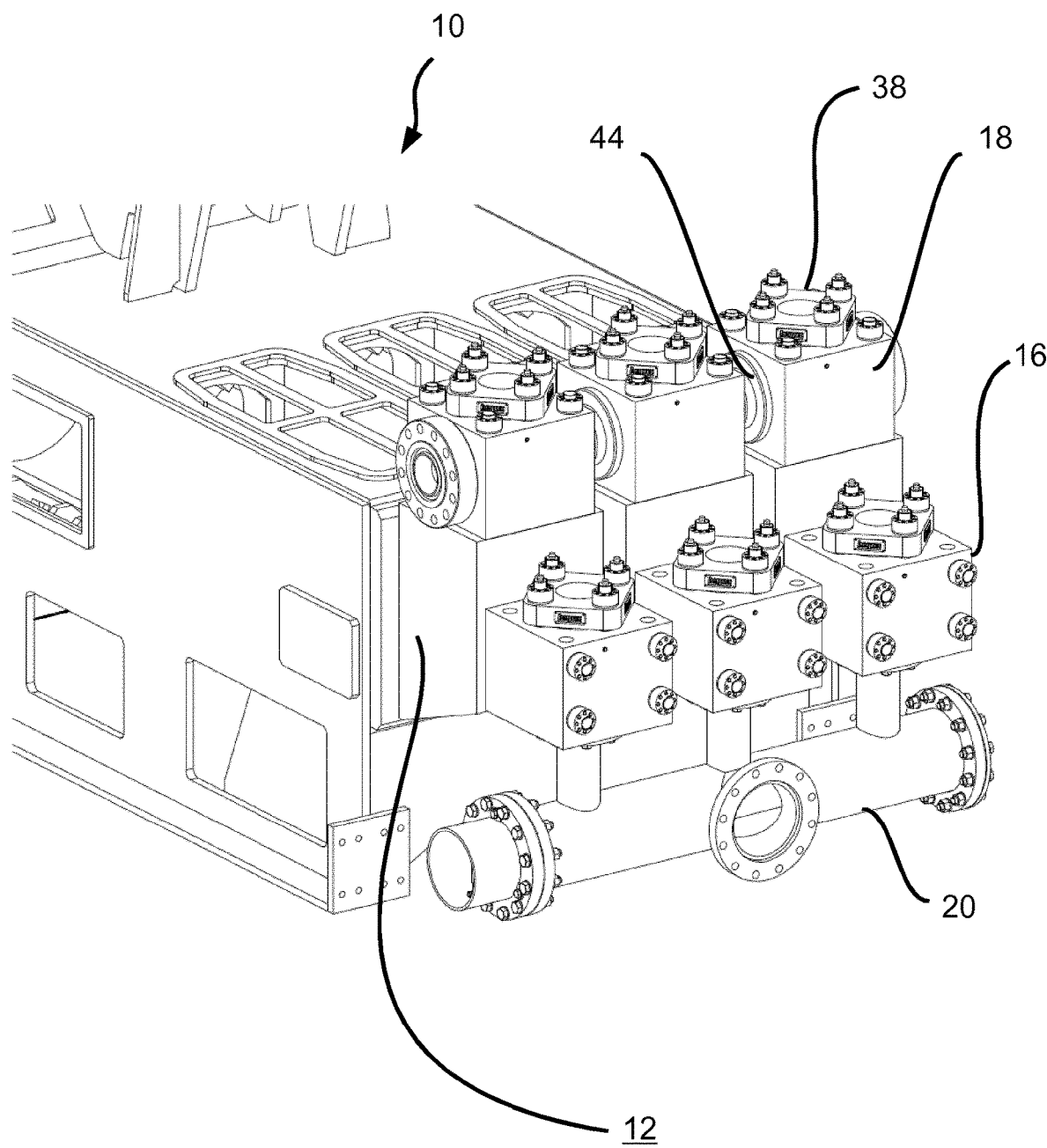
FIG. 4 shows an additional embodiment of a mud pump with modular fluid end modules attached to it.

FIG. 4 shows a mud pump (10) as well as modular fluid end modules (12) attached to it, wherein, in contrast to the embodiment shown in FIG. 1, some valve modules (16, 18) are not connected to lateral flanges by means of a manifold (20, 22), but by means of individual tubular connecting pieces (44), each of which is positioned between two adjoining valve modules (16, 18). In the embodiment shown, the connecting pieces (44) are located between the valve modules (18) designated as pressure modules (18). In addition or alternatively, there may also be such connecting pieces (44) between the valve modules (16) designated as suction modules (16). The valve modules (16, 18) for use with such connecting pieces (44) have a lower or lateral connection face which attaches to a support unit (14) and has an opening of the channel (26). In addition, such valve modules (16, 18) have further channel (26) openings in lateral faces—which are different from the connection face and opposite each other—for the attachment of a connecting piece (44) or a further pipeline.

In addition to the embodiment shown in FIG. 1, the embodiment shown in FIG. 4 is a further example of a fluid end module (12) intended for attachment to a mud pump (10); it incorporates a support unit (14) and in each case a suction module (16) and a pressure module (18) that is releasably connected or can be releasably connected to the support unit (14).

In an embodiment not shown, in which both the valve modules (16, 18) designated as suction modules (16) and the valve modules (16, 18) designated as pressure modules (18) are connected by means of connecting pieces (44), each of which is positioned between two adjoining valve modules (16, 18), valve modules (16, 18) with the same embodiment may be used, provided it is accepted that, in addition to the upward-aligned valve covers (38) of the valve modules (18) designated as pressure modules (18), the valve covers (38) of the valve modules (16) designated as suction modules (16) are aligned to the side. Then the side face opposite the side face with valve cover (38) functions as the connection face for attaching the respective valve module (16, 18) to the support unit (14). If it is of particular value that all valve covers (38) are facing upwards or to the side, two different configurations of valve modules (16, 18) are required. In one configuration, the side face of a valve module (16, 18) opposite the side face with valve cover (38) functions as a connection face for attachment to the support unit (14). In a second valve module (16, 18) configuration, one of the side faces adjoining the two side faces intended for the attachment of a connecting piece (44), or a further pipeline, functions as a connecting face for attachment to the support unit (14).

Figure 5:
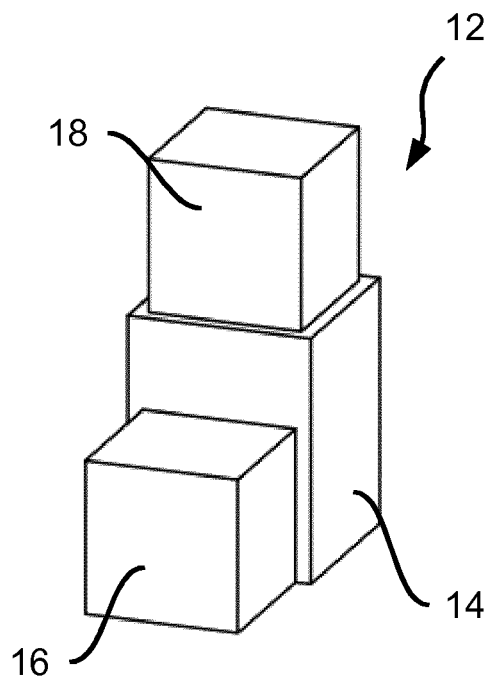
FIGS. 5 to 12 show different configurations of single and multiple fluid end modules or fluid ends for a piston pump.
Figure 6:
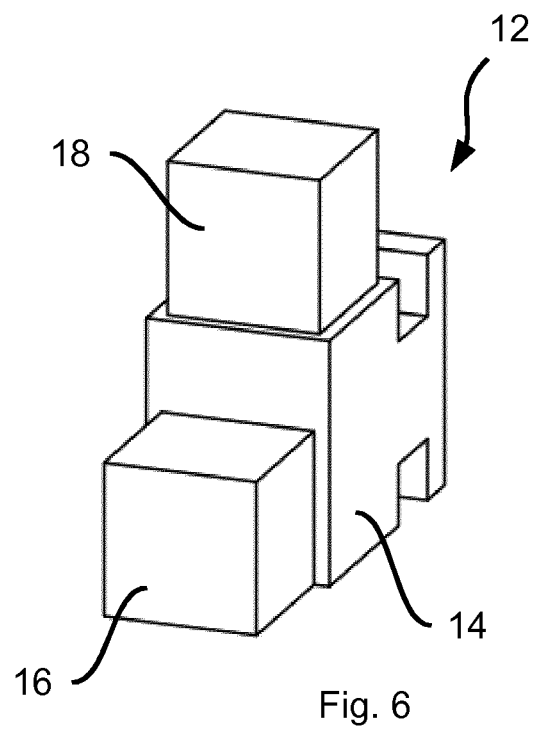

FIG. 5 and FIG. 6 each show—in schematically simplified form—a fluid end module (12) with a support unit (14) as the base and two valve modules (16, 18) attached to the support unit (14), one of which functions as a suction module and one as a pressure module. The two representations are intended to illustrate different possibilities for attaching the fluid end module (12) to the respective mud pump (10), specifically different possibilities for attaching the support unit (14) of the fluid end module (12) to the mud pump (10). In the case of the embodiment shown in FIG. 5, attachment is performed by means of threaded bolts which are guided out of the housing of the mud pump (10) from the inside, and are engaged into the threaded boreholes on the side of the support unit (14). In the embodiment shown in FIG. 6, attachment is performed by means of threaded bolts which lead through a base section of the support unit (14) into threaded boreholes in the housing of the mud pump.

Figure 7:
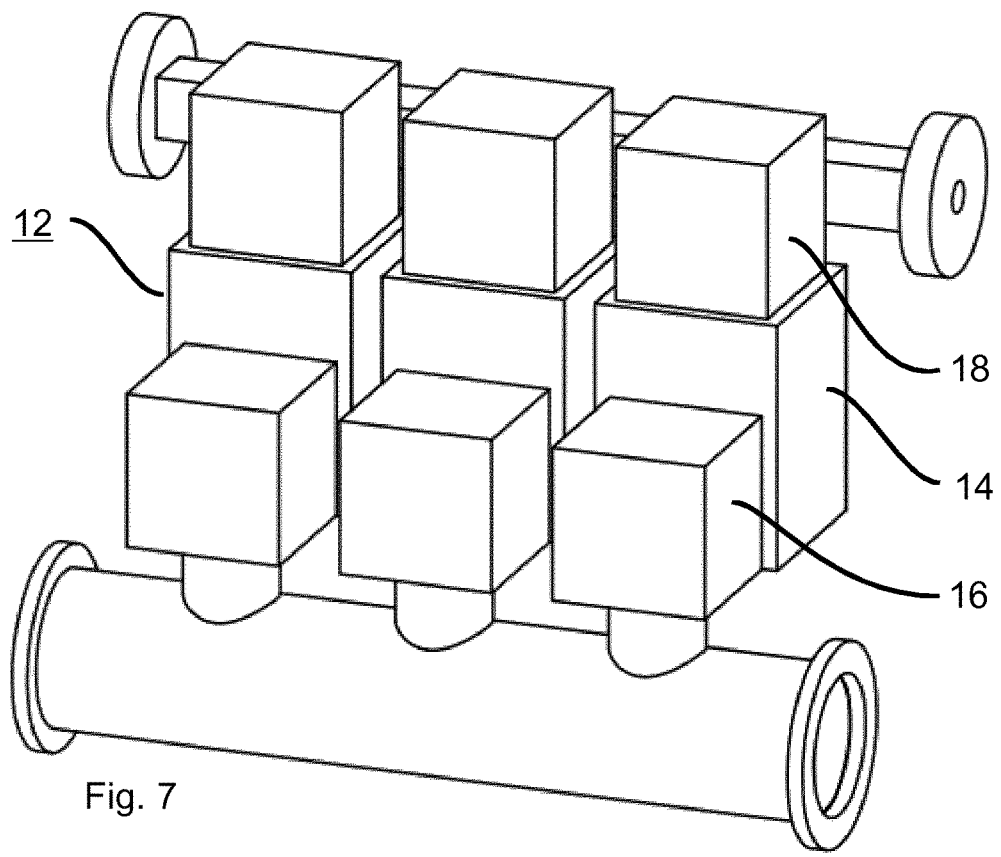
Figure 8:
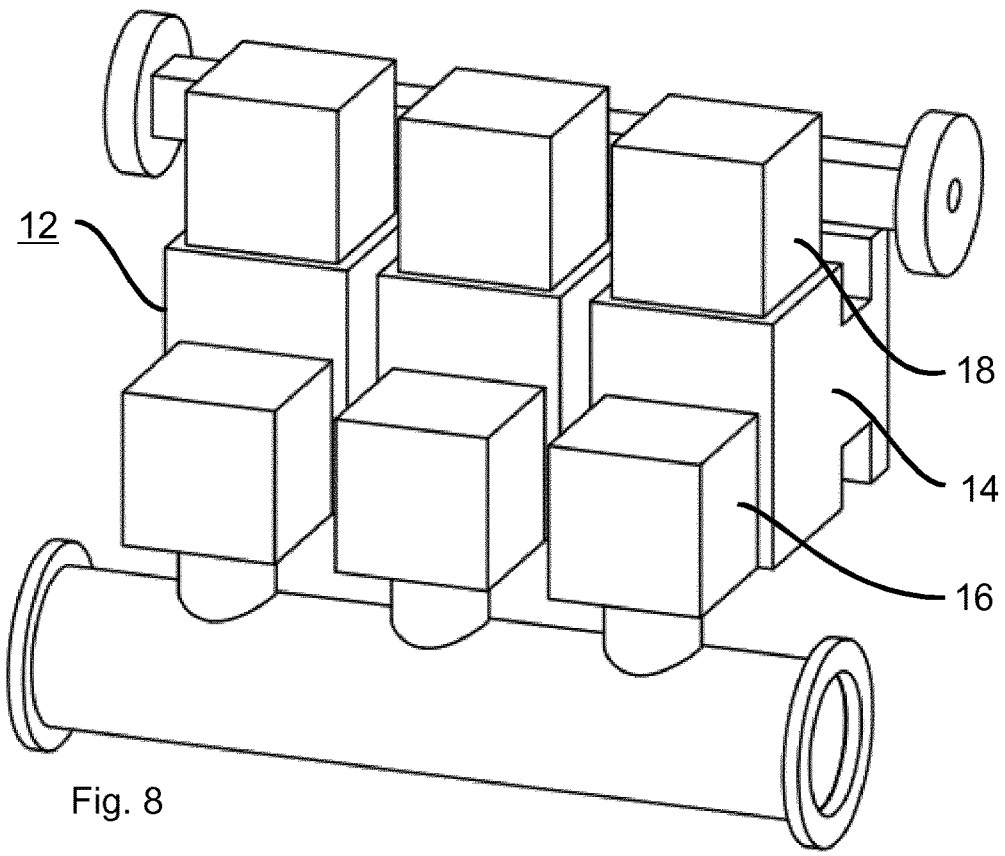

FIG. 7 and FIG. 8 each show a fluid end of a mud pump (10) (the mud pump itself is not shown) wherein each fluid end incorporates a plurality of fluid end modules (12) as represented in FIG. 5 and FIG. 6 respectively, for example with the number of fluid end modules (12) corresponding to the number of pistons on the mud pump (10). A manifold (suction-side manifold, pressure-side manifold) is shown upstream and downstream of the individual valve modules (16, 18).

Figure 9:
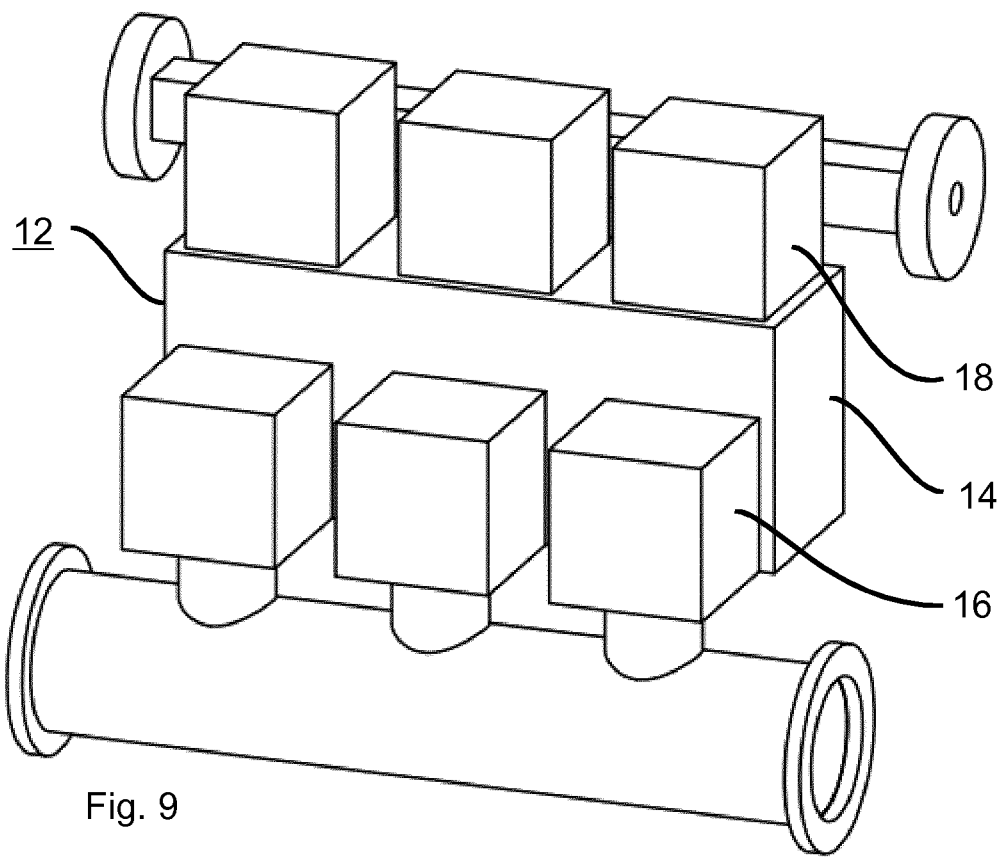
Figure 10:
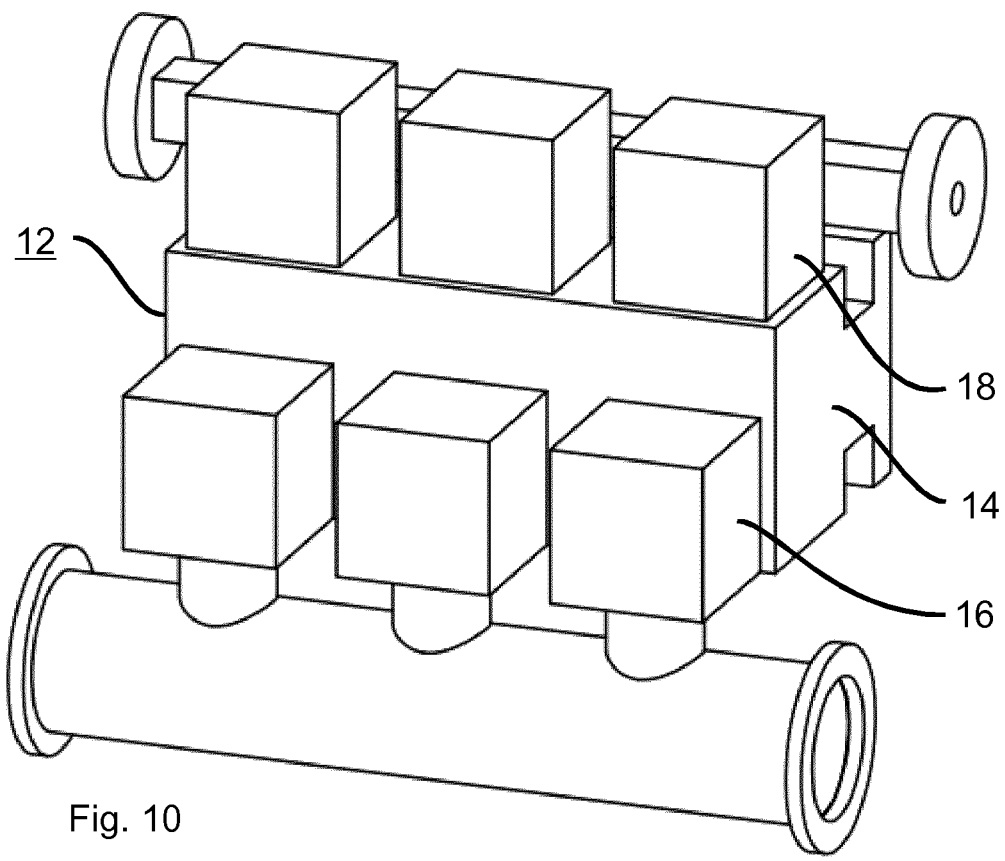

FIG. 9 and FIG. 10 each show a fluid end of a mud pump (10) (the mud pump itself is not shown) wherein the fluid end for all valve modules (16, 18) incorporated by it incorporates a common support unit (14). For the attachment of such a one-part support unit (14) to the respective mud pump (10), the above applies correspondingly in connection with the explanation of FIG. 5 and FIG. 6. A manifold (suction-side manifold, pressure-side manifold) is again shown upstream and downstream of the individual valve modules (16, 18).

Figure 11:
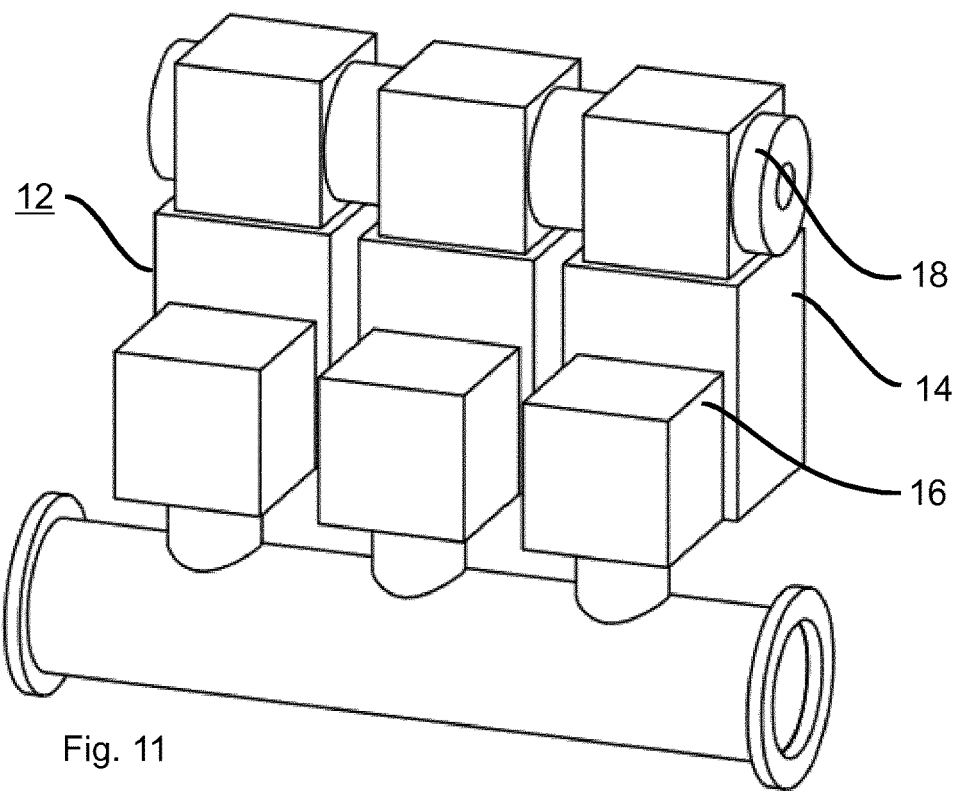

FIG. 11 shows a fluid end of a mud pump (10) (the mud pump itself is not shown) wherein some valve modules (16, 18) are connected by means of connecting pieces (44), each of which is positioned between two adjoining valve modules (16, 18). If such connecting pieces (44) are used, an additional manifold is not required. The connection of several valve modules (16, 18) by means of such connecting pieces (44) can be provided for on the suction side and/or on the pressure side of the fluid end.

Figure 12:
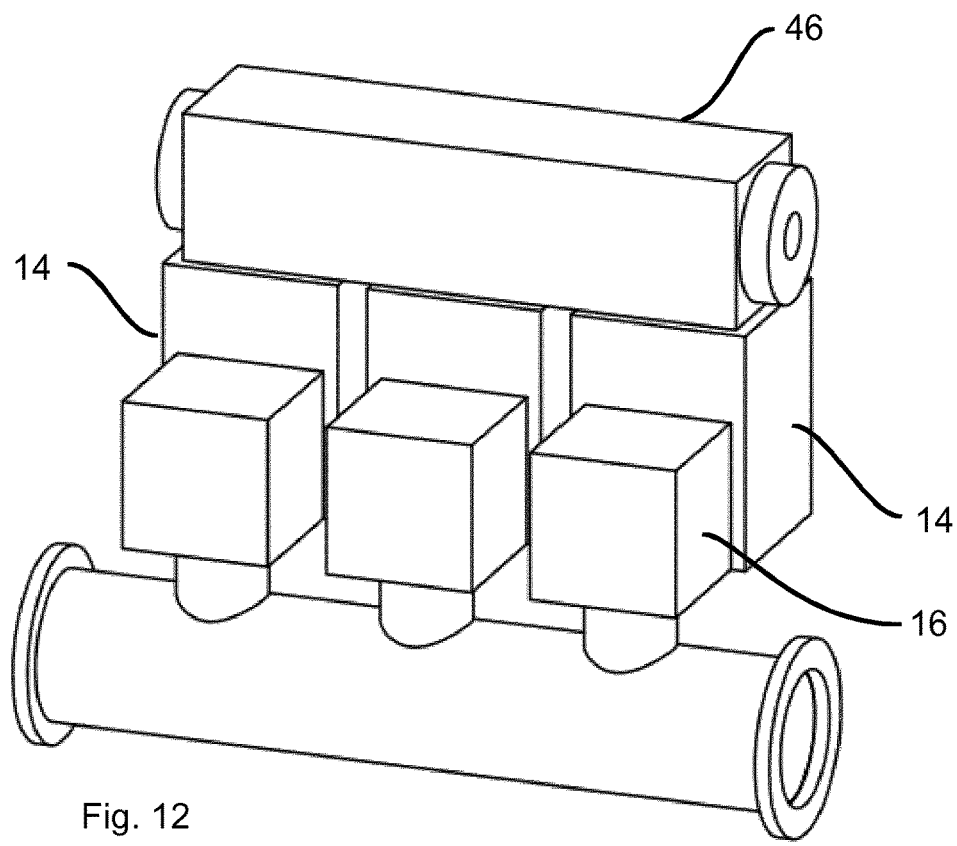

FIG. 12 shows a fluid end of a mud pump (10) (the mud pump itself is not shown) with a valve unit (46) incorporating several valves in place of individual valve modules (16, 18). Instead of a single valve unit (46) on one side and several individual valve modules (16, 18) on the other, the fluid end may also incorporate two such valve units (46), wherein one valve unit (46) functions as the suction-side valve unit (46) and another valve unit (46) as the pressure-side valve unit (46). With only one single valve unit (46)

(suction-side or pressure-side) and separate valve modules (16, 18), the valve unit (46) can be attached to the suction side or pressure side of the fluid end. In a special embodiment, such a valve unit (46), integrates the manifold, which is otherwise separately required.

The special embodiments shown in FIG. 11 and FIG. 12 (connecting pieces (44) in place of a multiple connector or a valve unit (46) in place of individual valve modules (16, 18)) are suitable for a fluid end with a plurality of support units (14) or a one-part support unit (14).

A few aspects of the description submitted here, which are in the foreground, can therefore be briefly summarized as follows: A fluid end or fluid end module (12) is stated, which is intended and set up for attachment to a piston pump (10). This incorporates a support unit (14) that is releasably connected or can be releasably connected to the piston pump (10) and at least one suction module (16) that is releasably connected or can be releasably connected to the support unit (14) and pressure module (18). This forms the basis for a modular concept for the fluid end of a multi-piston pump, in particular one functioning as a mud pump (10) during drilling operation. Accordingly, a number of fluid end modules (12) that corresponds to the number of pistons on the mud pump (10) function as part of the fluid end of the mud pump (10). These fluid end modules (12) are themselves modular and incorporate a support unit (14) intended for attachment to the mud pump (10) and two valve modules (16, 18) which can be releasably connected to the support unit (14). In a special embodiment, the valve modules (16, 18) have the same embodiment, wherein each valve module (16, 18) functions as a suction-side valve module (16) (suction module (16)) or as a pressure-side valve module (18) (pressure module (18)) and can be attached both to a suction-side and a pressure-side connection face of the support unit (14). Accordingly, the valve modules (16, 18) are of an embodiment of this type, and connection possibilities are provided on the side of the support unit (14) that enable each valve module (16, 18) to be connected to the suction side or pressure side of the support unit (14), meaning that the valve modules can be used individually. Overall, a fluid end of a mud pump (10) formed with such fluid end modules (12), and a mud pump (10) with such fluid end modules (12) are therefore also specified. Two or more support units (14), each designed for the attachment of two valve modules (16, 18), may also be combined to form a single support unit (14). These then form a support unit (14) in the form of a monoblock. Two times two valve modules (16, 18), three times two valve modules (16, 18), etc. can be attached to such a support unit (14), wherein the valve modules (16, 18) are each of the same embodiment, interchangeable with one another, and can be replaced individually. In general, a support unit (14) of the type proposed here is intended and set up to accommodate at least one pair of valve modules (16, 18), one of which functions as a suction module (16) and one as a pressure module (18).

REFERENCE SIGN LIST

10 Piston/mud pump
12 Fluid end module
14 Support unit (part of the fluid end module)
16 Valve module/suction module (part of the fluid end module)
18 Valve module/pressure module (part of the fluid end module)
20 Suction-side manifold
22 Pressure-side manifold
24 Channel (inside the support unit)
26 Channel (inside the valve module)
28 Blind hole (for attaching the support unit to a piston pump/mud pump)
30 Blind hole (for attaching a valve module, in particular a valve module functioning as a suction module, to a support unit)
32 Blind hole (for attaching a valve module, in particular a valve module functioning as a pressure module, to a support unit)
34 Valve (inside a valve module)
36 Valve seat (inside a valve module)
38 Valve cover (for the valve inside a valve module)
40 Borehole (in the valve module and parallel to the vertical axis of the valve module for attaching the valve module to a support unit at the valve module's lower connection face)
42 Borehole (in the valve module and perpendicular to the vertical axis of the valve module for attaching the valve module to a carrier unit at the valve module's lateral connection face)
44 Connecting piece (for connecting adjoining valve modules)
46 Valve unit

The invention claimed is:

1. A fluid end module (12) for attachment to a piston pump (10), wherein the fluid end module (12) incorporates a support unit (14) that can be releasably attached to the piston pump (10) and at least one suction module (16) and at least one pressure module (18) that are releasably connected or can be releasably connected to a suction-module side and a pressure-module side, respectively, of the support unit (14),
wherein each suction module (16) and pressure module (18) is structured as a valve module (16, 18), wherein each valve module (16, 18) comprises a valve (34) received in a valve seat (36),
wherein the support unit (14) and the/each suction module (16) as well as the/each pressure module (18) are of such an embodiment that the suction and pressure modules (16, 18) are interchangeable with one another,
wherein each suction module and pressure module (16, 18) has at least two planned lateral faces, one of which functions as a lower connection face and one—adjoining to and extending at an angle from the lower connection face—functions as a lateral connection face, wherein the lower connection face of the pressure module (18) faces towards the pressure-module side of the support unit (14) and the lateral connection face of the suction module (16) faces towards the suction-module side of the support unit (14) when releasably connected to the support unit (14), and
wherein a channel (26) is provided inside the respective suction module and pressure module (16, 18), which can be blocked and released by means of the valve (34) which is incorporated by the respective suction module and pressure module (16, 18), terminates at one end at the lower connection face and at another end at the lateral connection face that extends at an angle from the lower connection face.

2. A fluid end module (12) in accordance with claim 1, wherein the support unit (14) and the/each pressure module (18) are of such an embodiment that a plurality of pressure modules (18) are interchangeable with one another.

3. A fluid end module (12) in accordance with claim 1, wherein the support unit (14) and the/each suction module (16) are of such an embodiment that a plurality of suction modules (16) are interchangeable with one another.

4. A fluid end module (12) in accordance with claim 1, wherein the suction modules and pressure modules (16, 18) have identical valves (34) and identical valve seats (36).

5. Currently amended) A fluid end module (12) in accordance with claim 1, wherein the suction modules and the pressure modules (16, 18) are of identical embodiment and each suction module and each pressure module (16, 18) can be connected to the suction-module side or the pressure-module side of the support unit (14) on the basis of connection options provided in each case.

6. A fluid end module (12) in accordance with claim 1, wherein the support unit (14) is intended and set up to accommodate a plurality of pairs of pressure modules and suction modules (16, 18).

7. A fluid end module (12) in accordance with claim 1,
wherein the at least one suction module (16) and the at least one pressure module (18) can be releasably connected to the support unit (14) in each case, and
wherein the suction module (16) and the pressure module (18) are of the same embodiment.

8. A valve fluid end module (12) in accordance with claim 1, wherein the lower connection face is not parallel to the lateral connection face.

9. A support unit (14) for attaching to a piston pump (10),
wherein at least one suction module (16) and at least one pressure module (18) are structured to be releasably connected to a suction-module side and a pressure-module side, respectively, of the support unit (14),
wherein each suction module (16) and pressure module (18) is structured as a valve module (16, 18), wherein each valve module (16, 18) comprises a valve (34) received in a valve seat (36),
wherein the suction module (16) and the pressure module (18) are of the same embodiment, and
wherein each suction module and pressure module (16, 18) has at least two planned lateral faces, one of which functions as a lower connection face and one—adjoining to and extending at an angle from the lower connection face—functions as a lateral connection face, wherein the lower connection face of the pressure module (18) faces towards the pressure-module side of the support unit (14) and the lateral connection face of the suction module (16) faces towards the suction-module side of the support unit (14) when releasably connected to the support unit (14).

10. A support unit (14) in accordance with claim 9
with a channel (24) inside the support unit (14)
wherein the channel (24) is open to three lateral faces of the support unit (14), specifically to
one lateral face via which the support unit (14) is connected to the piston pump (10) when attached;
one lateral face on the suction-module side at which the lateral connection face of the valve module (16, 18) functioning as the suction module (16) can be attached or is attached; and
one lateral face on the pressure-module side at which the lower connection face of the valve module (16, 18) functioning as the pressure module (18) can be attached or is attached.

11. A valve module (16, 18) for attachment to a piston pump (10) by means of a support unit (14) in accordance with claim 9,
wherein the valve module (16, 18) comprises a valve (34) received in a valve seat (36),
wherein the valve module (16, 18) has at least two planned lateral faces, one of which functions as a lower connection face and one—adjoining to and extending at an angle from the lower connection face—functions as a lateral connection face,
wherein the channel (26) inside the valve module (16, 18) can be blocked and released by means of the valve (34) which is incorporated by the valve module (16, 18), terminates at one end at the lower connection face and at another end at the lateral connection face that extends at an angle from the lower connection face, and
wherein the lower connection face of the valve module (18) faces towards the support unit (14) when it is releasably connected to the pressure-module side of the support unit (14) and the lateral connection face of the valve module (16) faces towards the support unit (14) when it is releasably connected to the suction-module side of the support unit (14).

12. A valve module (16, 18) in accordance with claim 11, wherein the valve module (16, 18) has a cuboid basic shape with six lateral faces, one of which functions as the lower connection face and one of which—adjoining to and extending at an angle from the lower connection face—functions as the lateral connection face.

13. A valve module (16, 18) in accordance with claim 11
with a plurality of through boreholes (40) running perpendicularly to the lower connection face, wherein one end of the boreholes (40) is in the lower connection face and the other end is in a top lateral face of the valve module (16, 18) opposite the lower connection face, and
with a plurality of through boreholes (42) running perpendicularly to the lateral connection face, wherein one end of the boreholes (42) is in the lateral connection face and the other end is in a side lateral face of the valve module (16, 18) opposite the lateral connection face.

14. A support unit (14) in accordance with claim 9, wherein the lower connection face is not parallel to the lateral connection face.

15. A piston pump (10), comprising:
at least one fluid end module (12) for attachment to the piston pump (10), wherein the fluid end module (12) comprises:
at least one support unit (14) for attachment to the piston pump (10); and
at least one suction module (16) and at least one pressure module (18) each structured as a valve module (16, 18) to be releasably connected to a suction-module side and a pressure-module side, respectively, of the support unit (14),
wherein each suction module (16) and pressure module (18) is attached to the piston pump (10) by means of the support unit (14),
wherein each valve module (16, 18) comprises a valve (34) received in a valve seat (36),
wherein each valve module (16, 18) has at least two planned lateral faces, one of which functions as a lower connection face and one—adjoining to and extending at an angle from the lower connection face—functions as a lateral connection face, wherein the lower connection face of the valve module (18) faces towards the support unit (14) when it is releasably connected to the pressure-module side of the support unit (14) and the lateral connection face of the valve module (16) faces towards the support unit (14) when it is releasably connected to the suction-module side of the support unit (14), wherein a channel (26) is provided inside each valve module (16, 18), which can be blocked and released by means of the valve (34) which is incorporated by each valve module (16, 18), terminates at one end at the lower connection face and at another end at the lateral connection face that extends at an angle from the lower connection face, and wherein the suction module (16) and the pressure module (18) are of the same embodiment.

16. A piston pump (10) in accordance with claim 15, with a number of the support units (14) corresponding to the number of pistons on the piston pump (10), and in each case one valve module (16, 18) functioning as a suction module (16) and one functioning as a pressure module (18) on each support unit (14).

17. A piston pump (10) in accordance with claim 15 with a number of the fluid end modules (12) corresponding to the number of pistons on the piston pump (10).

18. A piston pump (10) functioning as a mud pump (10) for pumping drilling debris during deep drilling on carbon deposits or for geothermal energy in accordance with claim 15.

19. A piston pump (10) in accordance with claim 15, wherein the lower connection face is not parallel to the lateral connection face.

\* \* \* \* \*